US011675976B2

(12) United States Patent
Asaf et al.

(10) Patent No.: US 11,675,976 B2
(45) Date of Patent: Jun. 13, 2023

(54) EXPLOITATION OF DOMAIN RESTRICTIONS FOR DATA CLASSIFICATION

(71) Applicant: International Business Machines Corporation, Armonk, NY (US)

(72) Inventors: Sigal Asaf, Zichron Yaakov (IL); Ariel Farkash, Shinshit (IL); Lev Greenberg, Haifa (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 16/504,274

(22) Filed: Jul. 7, 2019

(65) Prior Publication Data

US 2021/0004637 A1    Jan. 7, 2021

(51) Int. Cl.
*G06F 40/279* (2020.01)
*G06N 5/02* (2023.01)
(Continued)

(52) U.S. Cl.
CPC ............ *G06F 40/279* (2020.01); *G06F 18/22* (2023.01); *G06F 18/2415* (2023.01); *G06N 5/02* (2013.01)

(58) Field of Classification Search
CPC .... G06K 9/628; G06K 9/6215; G06K 9/6277; G06K 9/00536; G06K 9/6267;
(Continued)

(56) References Cited

U.S. PATENT DOCUMENTS 9,049,195 B2    6/2015  Sack et al.
9,785,795 B2   10/2017  Grondin et al.
(Continued)

FOREIGN PATENT DOCUMENTS

CN    104102917 A    10/2014
CN    109034186 A    12/2018

OTHER PUBLICATIONS

Toward an Automatic detection of Sensitive Information in a Database Cédric du Mouza , Elisabeth Métais , Nadira Lammari, Jacky Akoka , Tatiana Aubonnet, Isabelle Comyn-Wattiau , Hammou Fadili, Samira Si-Saïd Cherfi, Towards an Automatic Detection of Sensitive Information in a Database, Proceedings of the 2010 Second International Conference on Advances in Databases, Knowledge, and Data Applications, p. 247-252, Apr. 11-16, 2010.

*Primary Examiner* — Margaret G Mastrodonato
(74) *Attorney, Agent, or Firm* — Gregory J Kirsch

(57) ABSTRACT

Embodiments of the present systems and methods may provide techniques to distinguish between data categories. For example, a method implemented in a computer system may comprise obtaining, at the computer system, a plurality of data strings in different categories, each category having a same string pattern, determining a loose string format and a set of restrictions based on at least one string pattern, classifying the plurality of data strings to respective different categories based on a loose string format of the data strings and on the restrictions on the data strings of the different categories using a classification score indicating utilizing restriction information of other categories when determining the matching of a category, and decreasing the classification score if a mean restriction matching proportion is not part of a category or is a threshold amount above an expected mean restriction matching proportion.

20 Claims, 9 Drawing Sheets

(51) Int. Cl.
*G06F 18/22* (2023.01)
*G06F 18/2415* (2023.01)

(58) Field of Classification Search
CPC .......... G06N 20/00; G06N 3/08; G06N 5/022;
G06N 5/025; G06N 5/02; G06N 5/04
See application file for complete search history.

(56) References Cited

U.S. PATENT DOCUMENTS

| | | | |
|---|---|---|---|
| 2008/0294656 A1* | 11/2008 | Bhat | G06F 16/90344 |
| 2011/0106743 A1* | 5/2011 | Duchon | G06F 16/35 |
| | | | 706/46 |
| 2012/0102417 A1* | 4/2012 | Li | G06F 3/0484 |
| | | | 715/762 |
| 2017/0124336 A1* | 5/2017 | Freudiger | G06F 40/242 |
| 2018/0314705 A1* | 11/2018 | Griffith | G06F 16/185 |
| 2019/0272296 A1* | 9/2019 | Prakash | G06F 16/243 |
| 2020/0134198 A1* | 4/2020 | Rudrabhatla | G06F 3/0623 |

* cited by examiner

Fig. 2

| Category | Loose formats | Restrictions |
|---|---|---|
| LLLDDDD | LLLDDDD | No constraints |
| Country ID | 9-digit string | Luhn checksum |
| SSN | 9-digit string | AAAGGSSSS<br>Area Code. AAA != 000, != 666, < 900<br>Group Number. GG != 00<br>Serial Number. SSSS != 0000 |
| Patient ID | 9-digit string | No constraints |

202 — (LLLDDDD row)
204 — (Country ID row)
206 — (SSN row)
208 — (Patient ID row)

Fig. 4

401  exponent ← 2

402  distance ← 4

403  looseFormat.numMatches ← number of values in $s$ that satisfy looseFormat.

404  restriction.numMatches ← number of values in $s$ that satisfy restriction.

405  restriction.mean ← looseFormat.numMatches * restriction.$rs$ 406  restriction.sd ← $\sqrt{}$(looseFormat.numMatches*restriction.$rs$*(1- restriction.$rs$) )

407  restriction.factor = ((restriction.numMatches - mean)^exponent) / (distance * $sd$)

408  factors ← Φ

409  if category contains restriction r:

factors ← factors ∪ restriction.factor 410  else factors ← factors ∪ (1-restriction.factor)

category.score = min(factors) * category.numMatches

Fig. 5

501   FormatSet ←all formats that share the same looseFormat.

502   For each FormatSet:

503         LooseFormatNumMatches ←Number of values in $S$ that satisfy the looseFormat 504         RestrictionSet ←List of all restrictions belong to the formats in FormatSet 505         For each restriction in RestrictionSet 506               restriction.numMatches ←Number of values in $S$ that satisfy the restriction 507   // Normal distribution to binomial 508   $rs$ ← restriction.$rs$ 509   mean ← looseFormatNumMatches * $rs$ 510   variance ←looseFormatNumMatches * $rs$ * (1- $rs$)

511   sd ←sqrt(variance)

512   restriction.randomFactor = ((restriction.numMatches - mean)^exponent) / (distance * sd)

513   For each format in FormatSet 514         allFactors ←emptyList

515         For each restriction in RestrictionSet

516               If format contains restriction 517                     allFactors.add(restriction.randomFactor)

518               else 519                     allFactors.add(1- restriction.randomFactor)

520                           formatScore ←((min   (allFactors)* format.numMatches))/(|S|)

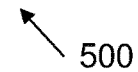
500

Fig. 6

| No errors | SSN | CID | PID |
|---|---|---|---|
| SSN | 1.0 | 0.89 | 0.9 |
| Country ID | 0.1 | 1.0 | 0.1 |
| Patient ID | 1.0 | 1.0 | 1.0 |

— 602

| 5% errors | n1 | n2 | n3 |
|---|---|---|---|
| SSN | 0.95 | 0.89 | 0.89 |
| Country ID | 0.09 | 0.95 | 0.12 |
| Patient ID | 1.0 | 1.0 | 1.0 |

— 604

| 10% errors | n1 | n2 | n3 |
|---|---|---|---|
| SSN | 0.9 | 0.9 | 0.91 |
| Country ID | 0.1 | 0.9 | 0.12 |
| Patient ID | 1.0 | 1.0 | 1.0 |

| No errors | n1 | n2 | n3 |
|---|---|---|---|
| SSN | 0.98 | 0 | 0.04 |
| Country ID | 0 | 0.96 | 0 |
| Patient ID | 0 | 0 | 0.94 |

— 702

| 2% errors | n1 | n2 | n3 |
|---|---|---|---|
| SSN | 0.97 | 0 | 0.02 |
| Country ID | 0 | 0.95 | 0 |
| Patient ID | 0 | 0 | 0.95 |

— 704

| 5% errors | n1 | n2 | n3 |
|---|---|---|---|
| SSN | 0.92 | 0 | 0.01 |
| Country ID | 0 | 0.93 | 0 |
| Patient ID | 0 | 0 | 0.96 |

— 706

| 10% errors | n1 | n2 | n3 |
|---|---|---|---|
| SSN | 0.07* | 0 | 0.02 |
| Country ID | 0 | 0.89 | 0.01 |
| Patient ID | 0.92* | 0 | 0.95 |

— 708

EXPLOITATION OF DOMAIN RESTRICTIONS FOR DATA CLASSIFICATION

BACKGROUND

The present invention relates to techniques that to provide classify data into data categories with the same basic string pattern when multiple values are available by exploiting differing data type restrictions.

Organizations are now required to support privacy regulations such as the European Union (EU) General Data Protection Regulation (GDPR). For this and for other reasons, organizations need to protect the sensitive data they store. In order to accomplish this, organizations need to (1) search and discover the sensitive data in their data stores, and (2) match data to its appropriate category. This is important since organizations need to know which regulation to adhere, such as demographic, health, biometric or other regulations.

The second step typically requires differentiating values that from an initial look, such as from the string pattern, and for untrained eyes, may belong to two or more different data categories. For example, in classifying a column in a relational database, the naive classifier may score the match of a category to a column by checking the proportion of values that satisfy the category domain. The naive classification score is the calculated proportion. However, this method fails whenever a value matches more than one classifier. In such cases, different classifiers may provide similar or the same score. For example, a 9 digit sequence, such as 427356720, may be a Social Security Number, a foreign country ID number, a patient ID number, a student ID number, etc. Furthermore, whenever the data includes error, the true category may get a lower score than other categories.

A simple conventional solution that is used is to manually prioritize the classifiers. However, this requires manual work and still may fail when the data includes errors. For example, a 9 digit patient ID string that has no restrictions, will win out over country ID that has a restriction of a Luhn checksum. This may be the case even with a low checksum error rate of 2%, since the patient ID will seemingly have no mistakes due to the fact that it does not have any restrictions. But it is obvious that if 98% of the values match the Luhn checksum that has a random chance of 1 in 10 match, we are talking about a country ID with some errors, and not a patient ID.

Accordingly, a need arises for techniques to distinguish between data categories that will give good scoring to the actual data category, and bad scoring to the wrong data category even though it matches the string pattern.

SUMMARY

Embodiments of the present systems and methods may provide techniques to distinguish between data categories and that will give good scoring to the actual data category, and bad scoring to the wrong data category even though it matches the string pattern. For example, embodiments may provide a classification score for data categories with the same basic string pattern when multiple values are available by exploiting differing data type restrictions. Embodiments may be used in any data classification system that considers multiple values and provides the ability to distinguish between similar data types required to properly address privacy regulations such as GDPR.

For example, in an embodiment, a method implemented in a computer system comprising a processor, memory accessible by the processor, computer program instructions stored in the memory and executable by the processor, and data stored in the memory and accessible by the processor, may comprise obtaining, at the computer system, data including a plurality of data strings of a plurality of different categories, the data strings in each category have a same string pattern, determining a loose string format and a set of restrictions based on at least one string pattern, classifying the plurality of data strings to respective different categories based on a loose string format of the data strings and on the restrictions on the data strings of the different categories by determining a classification score indicating a match of a data string that matches the loose string pattern and meets the restrictions, wherein the classifying utilizes restriction information of other categories when determining the matching of a category, and decreasing the classification score if a mean restriction matching proportion is not part of a category or is a threshold amount above an expected mean restriction matching proportion.

In embodiments, the method may further comprise collecting all restrictions of a plurality of categories. Matching proportion of a restriction and an expected mean may be determined by determining a mean restriction matching proportion of the plurality of data strings, determining an expected mean restriction matching proportion using values obtained randomly from a domain of values, and generating a score indicating a correspondence between the restriction matching proportion and the expected restriction matching proportion. The threshold amount may be four standard deviations. Classifying may comprise determining a distance between a distribution of plurality of data strings and a distribution each of the category and determining a classification score based on the determined distances. The classifying may comprise determining a distribution of a plurality of data strings, determining a distance between the determined distribution and a plurality of known distributions of categories of data, and selecting as a category of the plurality of data strings a category from the plurality of known distributions of categories having a minimum determined distance. The determined distribution may comprise one of a normal distribution or a discrete distribution, and the distance is determined according to a Kullback-Leibler distance.

In an embodiment, a system may comprise a processor, memory accessible by the processor, computer program instructions stored in the memory and executable by the processor, and data stored in the memory and accessible by the processor to perform obtaining, at the computer system, data including a plurality of data strings of a plurality of different categories, the data strings in each category have a same string pattern, determining a loose string format and a set of restrictions based on at least one string pattern, classifying the plurality of data strings to respective different categories based on a loose string format of the data strings and on the restrictions on the data strings of the different categories by determining a classification score indicating a match of a data string that matches the loose string pattern and meets the restrictions, wherein the classifying utilizes restriction information of other categories when determining the matching of a category, and decreasing the classification score if a mean restriction matching proportion is not part of a category or is a threshold amount above an expected mean restriction matching proportion.

In an embodiment, a computer program product may comprise a non-transitory computer readable storage having program instructions embodied therewith, the program instructions executable by a computer, to cause the computer to perform a method comprising obtaining, at the computer system, data including a plurality of data strings of a plurality of different categories, the data strings in each category have a same string pattern, determining a loose string format and a set of restrictions based on at least one string pattern, classifying the plurality of data strings to respective different categories based on a loose string format of the data strings and on the restrictions on the data strings of the different categories by determining a classification score indicating a match of a data string that matches the loose string pattern and meets the restrictions, wherein the classifying utilizes restriction information of other categories when determining the matching of a category, and decreasing the classification score if a mean restriction matching proportion is not part of a category or is a threshold amount above an expected mean restriction matching proportion.

BRIEF DESCRIPTION OF THE DRAWINGS

The details of the present invention, both as to its structure and operation, can best be understood by referring to the accompanying drawings, in which like reference numbers and designations refer to like elements.

FIG. 2 is an exemplary block diagram of data formats and restrictions according to embodiments of the present systems and methods.

FIG. 4 is an exemplary flow diagram of a process utilizing the random probability according to embodiments of the present systems and methods.

FIG. 5 is an exemplary flow diagram of a process exemplary process of classifying values according to embodiments of the present systems and methods.

FIG. 6 illustrates exemplary results for trivial scoring according to embodiments of the present systems and methods FIG. 7 illustrates Exemplary results for test cases according to embodiments of the present systems and methods.

DETAILED DESCRIPTION

Embodiments of the present systems and methods may provide techniques to distinguish between data categories and that will give good scoring to the actual data category, and bad scoring to the wrong data category even though it matches the string pattern. For example, embodiments may provide a category score for data categories with the same basic string pattern when multiple values are available by exploiting differing data type restrictions. Embodiments may be used in any data classification system that considers multiple values and provides the ability to distinguish between similar data types required to properly address privacy regulations such as GDPR.

Figure 1:
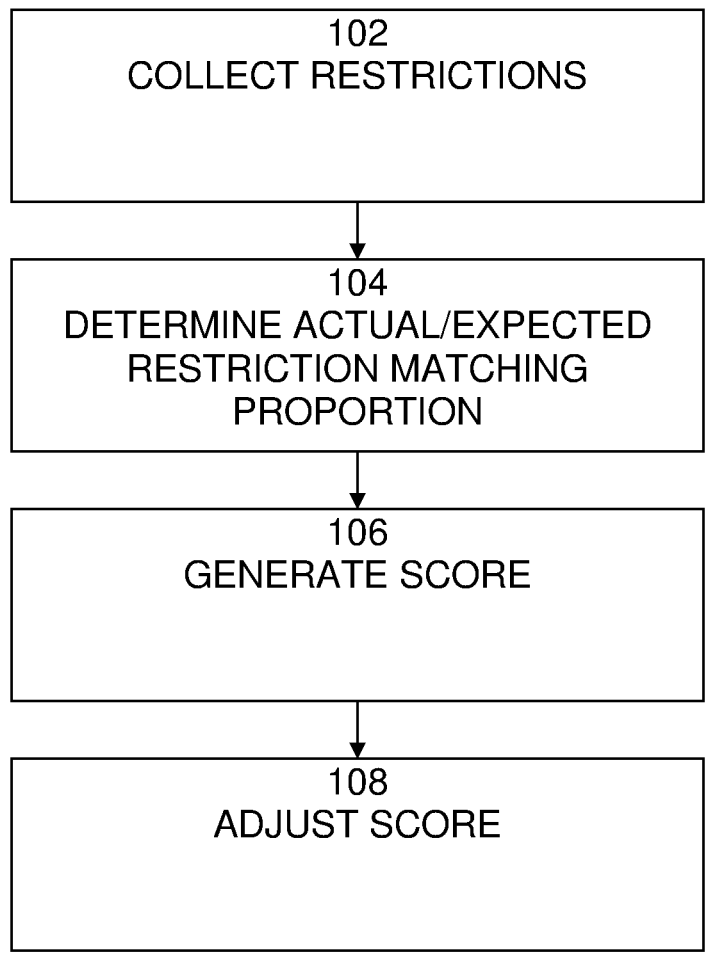
FIG. 1 is an exemplary flow diagram of a process according to embodiments of the present systems and methods.

An exemplary flow diagram of a process 100 according to the present techniques is shown in FIG. 1. Process 100 may begin at 102, in which all restrictions that are related to the same set of values may be collected. At 104, the actual restriction matching proportion (which may be expressed as a percentage, fraction, etc.) may be determined for the input values, along with the expected matching proportion assuming the values are taken by random from a common domain. At 106, given actual and expected proportions, and the category its own restriction, a corresponding match score may be generated. At 108, a category match score may be decreased if a matching proportion of a restriction which is not part of the category is significantly above its expected mean, for example, greater than four standard deviations higher. This may utilize restriction information of one category when checking the matching of another category. The input to process 100 may include a list of values (strings) and the output may include category match scores.

The advantages are that this method, compared to manual prioritization, is done automatically, provides a more accurate score, and handles data which includes errors. Embodiments may utilize the probability that the values satisfy a random restriction and may decrease a category score if a restriction that is not part of the category displays a high matching proportion. Embodiments may utilize the understanding that categories may share a common domain. Thus, a restriction matching a proportion of one category may be utilized when calculating the score of another category.

In order to use a restriction's random probability, the following definitions may be used:

1. Classifier—may check if a set of values belongs to a specific category. The classifier may contain a category name and a format. A value may belong to the category if it matches the format.

2. Loose format. Based on format's length and its alphabet a new format may be defined, which may be termed a "loose format". The loose format may be a superset of the format, and may be based on the format's alphabet and length. The loose format may contain all the values belonging to the original format but may be less restrictive. This may be defined as: The loose format length may be the same as the original format length. Given a string s in the loose format, a character in s at position i should be from the same alphabet as the character at position i in the original format.

For example, as shown in FIG. 2, an original format 202 may be: LLLDDDD, where L is a capital Latin letter, D is a Digit, LLL is a city code with not all combinations allowed, and DDDD is a date in day, day, month, month (DDMM) format, with only valid dates allowed. The corresponding loose format may be: LLLDDDD (without any additional restrictions). Other examples may include a 9 digit country ID number, which may have a loose format of a 9 digit string and restrictions that the 9 digits meet a Luhn checksum. A Social Security Number (SSN) may have a loose format of a 9 digit string and restrictions that the first three digits cannot be 000, 666, and must be less than 900, the next two digits cannot be 00, and the last four digits cannot be 0000. A 9 digit patient ID number may have a loose format of a 9 digit string and no further restrictions.

3. Format restrictions—on top of the loose format, a number of restrictions may be added. A value matches a format only if it matches the loose format, and all the format restrictions.

4. Format Strength (FS)—a double number between 0 to 1 that provides an indication on how restrictive the format may be. A lower value may indicate a more restrictive format. For example, FS=(size(format))/(size(loose format))

5. Restriction Strength (RS)—a double number between 0 to 1 that provides an indication on how strong the restriction may be. A lower value may indicate a stronger restriction. For example, RS=the probability that a random value that meets the loose format matches the restriction. A value may match a format only if it matches the loose format, and all the format restrictions.

6. Basic score/naïve classification score: the proportion of values that match the format.

Figure 3:
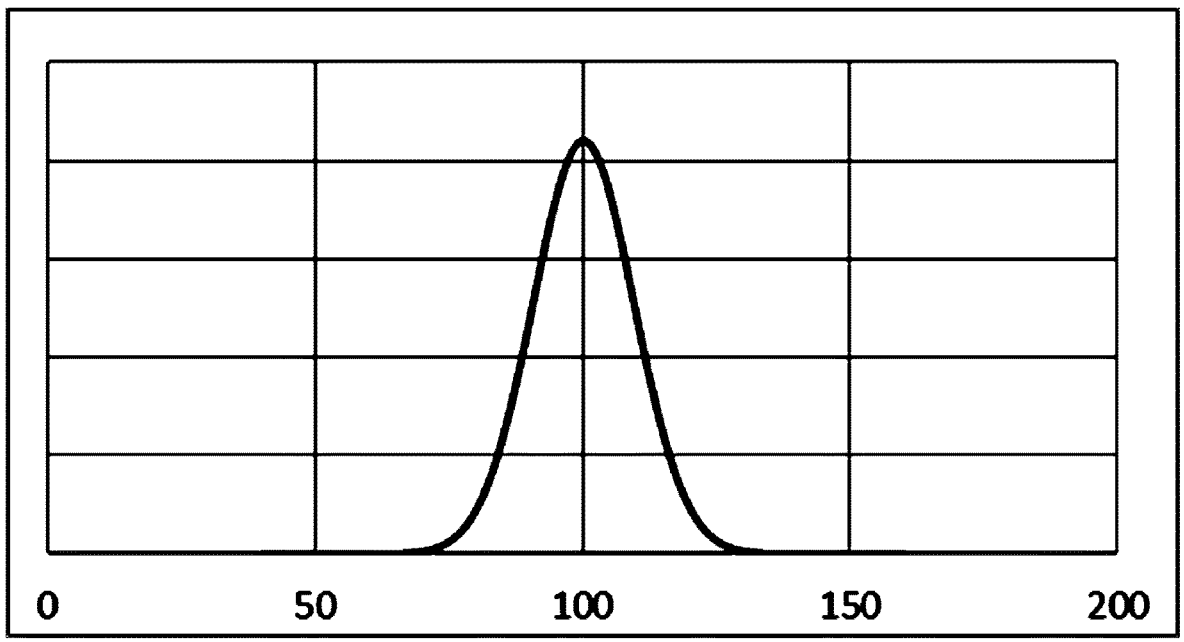
FIG. 3 is an exemplary illustration of an expected distribution for the number of matches to a Luhn checksum according to embodiments of the present systems and methods.

At 104, shown in FIG. 1, an expected restriction matching proportion may be determined. Embodiments may determine such a proportion according to, given n values and a restriction r, if $n*rs \geq 5$ and $n*(1-rs) \geq 5$, the normal approximation to the binomial may be used with $\mu=n*rs$ and $\sigma^2=n*rs*(1-rs)$. For example, given 1000 random 9-digits strings, and the Luhn checksum (which adds a check digit to n-digit string) (rs=0.1), the expectation would be, for 9-digit random values, about 100 strings match the Luhn checksum ($\mu=100$ and $\sigma$ (standard deviation)=9.48). FIG. 3 illustrates the expected distribution for the number of matches to a Luhn checksum, given 1000 values generated randomly from the loose format (9 digit strings). When the number of matches to the Luhn checksum is significantly above the mean, for example, greater than four standard deviations, then the data is not random. In this example, the Luhn factor may be computed as $$\frac{(140-100)^4}{4 \times 9.5}.$$

Given samples of actual values, it may be assumed that if the number of values that match a specific restriction is near the mean of the corresponding expected normal distribution, the restriction doesn't hold and the result occurs by chance. When the number of matches is much higher than the mean, for example, greater than four standard deviations above the mean, it may be assumed that this doesn't occur by chance, and the restriction holds. The constraint of a restriction r on a sample increases the chance that the category sample required the restriction, and decreases the chance that the sample's category doesn't include this restriction. When computing a category score, this information should be considered, and be reflected in the score.

An exemplary process 400 utilizing the random probability is shown in FIG. 4. Process 400 begins at 401, in which the exponent may be set to, for example, 2, and at 402, in which the distance may be set to, for example, 4. At 403, the number of values in s that satisfy the loose format may be determined. At 404, the number of values in s that satisfy the restrictions may be determined. At 405, the mean of the number of values in s that satisfy the loose format may be determined. At 406, the number of standard deviations that the matches are from the mean may be determined. At 407, a restriction factor (probability) may be determined according to, for example, $$\frac{(restriction.numMatches - restriction.mean)^{exponent}}{distance \times restriction.sd}.$$

At 408, the set of factors may be initialized to an empty set. At 409, it may be determined whether a category contains a restriction r. If so, then at 410, the set of factors may be set to the union of the current set of factors and the restriction factor determined in 407. If not, then at 412, the set of factors may be set to the union of the set of factors and the complement of the restriction factor, and at 413, the category score may be set to the minimum of the set of factors times the category matches.

An exemplary process 500 of classifying values is shown in FIG. 5. In this example, S denotes the set of values to classify. Process 500 begins at 501, in which FormatSet may be set to the set of all formats that share the same loose format. At 502, for each FormatSet, at 503 the number of values in S that satisfy the loose format may be determined, and at 504, a list of all restrictions belonging to the formats in FormatSet may be determined. At 505, for each restriction in RestrictionSet, at 506, the number of values in S that satisfy the restriction may be determined. At 507, a process of determining a normal distribution to the binomial may begin. At 508, restriction strength may be determined. At 509, the weighted mean of the restriction strengths of the loose format matches may be determined. At 510, the variance of the loose format matches may be determined. At 511, the standard deviation of the loose format matches may be determined. At 512, a random factor may be determined. At 513, for each format in FormatSet, at 514, all factors may be set to empty and 515, for each restriction, at 516, it may be determined if a format contains a restriction. That is, for each restriction, for each column value, it may be determined if the value satisfies the restriction, and the number of matches may be counted. At 517, if the format contains the restriction, a random factor may be added to the factors for that format. At 518, if the format does not contain the restriction, at 519, the complement of the random factor may be added to the factors for that format, and at 520, a format score may be determined, based on the number of restriction matches of that category and restriction matches of other categories. The restriction factor may be determined according to, for example, $$\frac{(restriction.numMatches - restriction.mean)^{exponent}}{distance \times restriction.sd}.$$

Thus, a score may be reduced if the matches for other category restrictions are significantly higher than expected on random values.

Exemplary results 600 for trivial scoring are shown in FIG. 6. For example, given three 9 digit strings with different restrictions, such as a Social Security Number (SSN), Country ID (CID), and a Patent ID (PID), the results 600 with varying amounts of errors are shown. For example, with no errors 620, the proportion of SSNs that match as SSNs is 1.0 (100%), the proportion of SSNs that match as CIDs is 0.89, and the proportion of SSNs that match as PIDs is 0.9. Results are shown for CIDs and PIDs as well Likewise, results are shown for 5% errors 604 and 10% errors 606. proportion of SSNs that match as CIDs is 0.89, and the proportion of SSNs that match as PIDs is 0.9. Results are shown for CIDs and PIDs as well Likewise, results are shown for 5% errors 604 and 10% errors 606.

Exemplary results 700 for test cases is shown in FIG. 7. These examples are based on 5 samples from each category, each sample contains 1000 records, and with varying proportions of errors. These results show an example of the capability of the present systems and methods to classify the data. For example, with no errors 702, all three of the SSN, CID, and PID are strongly correctly classified. Likewise with 2% errors 704, 5% errors 704, and 10% errors 708, except in the case of the SSN at 10% errors, which indicates that a weak restriction in combination with high error rate may be a problem.

As another example of data, health data commonly contains numeric values. For example, High Density Lipoprotein (HDL), Low Density Lipoprotein (LDL), High Blood Pressure, and Low Blood Pressure, etc. all may be represented by numeric values. Other categories, such as number of school years and number of children, may also include numeric values. Such values may be very difficult for the naive classification to categorize correctly because the values range may overlap and single value classification may not be possible. For example, the value range for Ammonia level in blood may be 15-50 µmol/L, while the value range for Ceruloplasmin may be 15-60 mg/dL. Thus, any valid Ammonia level value may also be a valid Ceruloplasmin value, and most valid Ceruloplasmin values may also be a valid Ammonia value. As a result, the classifier can't differentiate between these two categories, and many other categories which contains similar values.

Accordingly, embodiments may use additional statistics information on the data. Many human tests, such as blood tests, may classify characteristics using, for example, a normal distribution. Other categories such as number of children may be classified using, for example, a discrete distribution. Embodiments may utilize these characteristics to provide a more accurate classifier to such categories.

Normal Distribution Classifier and Discrete Distribution Classifier. Both classifiers compare the statistic characteristics of column data with known distributions. The Normal Distribution Classifier may use the data's mean and standard deviation. The Discrete Distribution Classifier may use the data's histogram (for each value, its count, and its proportional part). Both distributions may determine the distance between the column's statistic information to known distributions, for example, the number of sleeping hours, and may select a category which minimizes the distance. For the Normal Distribution, or other continuous distribution, the distance may be determined using, for example, the Kullback-Leibler Distance (KL distance): For distributions P and Q of a continuous random variable, the Kullback-Leibler distance may be defined to be the integral:

$$D_{KL}(P\|Q) = \int_{-\infty}^{\infty} p(x)\log\left(\frac{q(x)}{p(x)}\right)dx.$$

For the Discrete Distribution, the KL distance may be determined according to: For discrete probability distributions P and Q defined on the same probability space, the Kullback-Leibler distance between P and Q may be defined as:

$$D_{KL}(P\|Q) = \sum_{a \in X} P(x)\log\left(\frac{Q(x)}{P(x)}\right).$$

Figure 9:
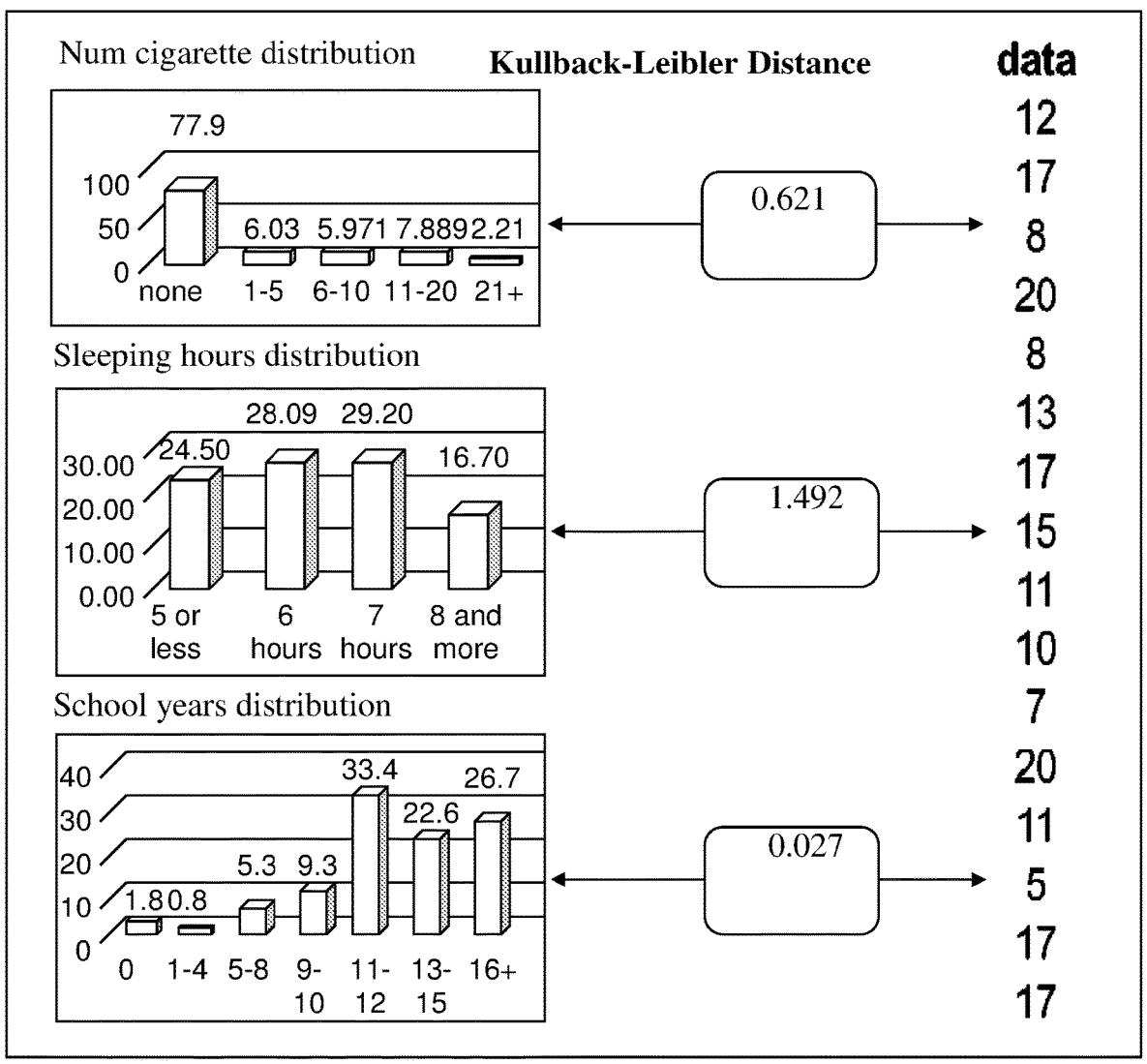
FIG. 9 illustrates examples of the solution given discrete categories: num cigarette, sleeping hours, and school years.

FIG. 9 illustrates examples of the solution given discrete categories: num cigarette, sleeping hours, and school years. Given a list of data, all data belongs to the same category, the classifier generates the data's discrete distribution, and determines the KL distance between each category distribution and the generated distribution. Finally, the best match is selected. In this case, the KL distance with school years provides the best result, and school years may be selected as the data category.

Figure 8:
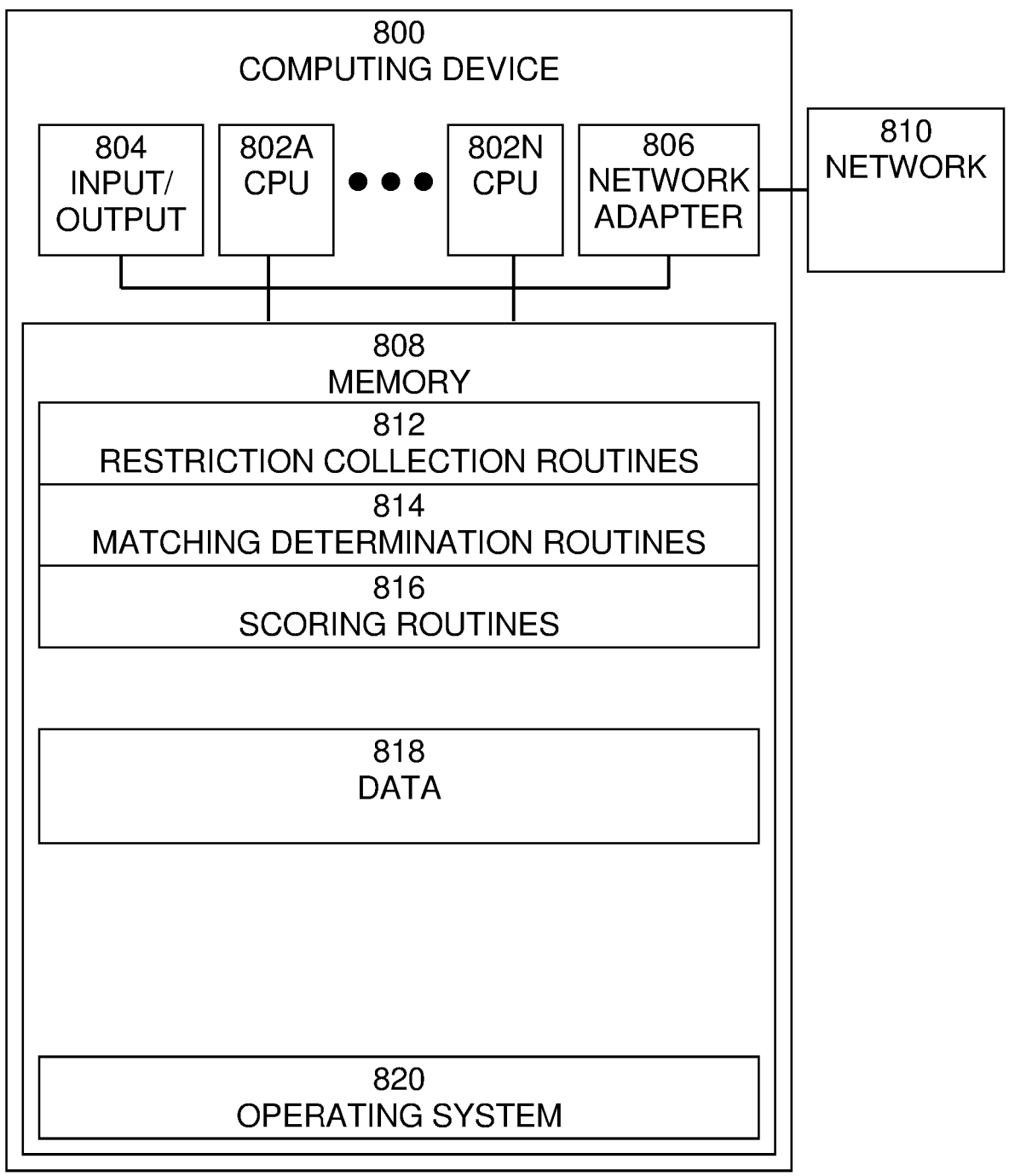
FIG. 8 is an exemplary block diagram of a computer system, in which processes involved in the embodiments described herein may be implemented.

An exemplary block diagram of a computer system 800, in which processes involved in the embodiments described herein may be implemented, is shown in FIG. 8. Computer system 800 may be implemented using one or more programmed general-purpose computer systems, such as embedded processors, systems on a chip, personal computers, workstations, server systems, and minicomputers or mainframe computers, or in distributed, networked computing environments. Computer system 800 may include one or more processors (CPUs) 802A-802N, input/output circuitry 804, network adapter 806, and memory 808. CPUs 802A-802N execute program instructions in order to carry out the functions of the present communications systems and methods. Typically, CPUs 802A-802N are one or more microprocessors, such as an INTEL CORE® processor. FIG. 8 illustrates an embodiment in which computer system 800 is implemented as a single multi-processor computer system, in which multiple processors 802A-802N share system resources, such as memory 808, input/output circuitry 804, and network adapter 806. However, the present communications systems and methods also include embodiments in which computer system 800 is implemented as a plurality of networked computer systems, which may be single-processor computer systems, multi-processor computer systems, or a mix thereof.

Input/output circuitry 804 provides the capability to input data to, or output data from, computer system 800. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 806 interfaces device 800 with a network 810. Network 810 may be any public or proprietary LAN or WAN, including, but not limited to the Internet.

Memory 808 stores program instructions that are executed by, and data that are used and processed by, CPU 802 to perform the functions of computer system 800. Memory 808 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 808 may vary depending upon the function that computer system 800 is programmed to perform. In the example shown in FIG. 8, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 8, memory 808 may include restriction collection routines 812, matching determination routines 814, scoring routines 816, data 818, and operating system 820. Restriction collection routines 202 may include software routines that collect restrictions related to the same set of values among the data 818 as described above. Matching determination routines 814 may include software routines that determine actual and expected matching proportions for the input values in data 818 as described above. Scoring routines 816 may include software routines that determine a category match score and may adjust the category match score as described above. Operating system routines 820 may provide overall system functionality.

As shown in FIG. 8, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, computer program instructions stored in the memory and executable by the processor, and data stored in the memory and accessible by the processor, the method comprising:
   obtaining, at the computer system, data including a plurality of data strings of a plurality of categories, the data strings in each category having a same string pattern;
   determining a loose string format and a set of restrictions based on at least one string pattern;
   classifying the plurality of data strings to respective categories based on the loose string format of the data strings and on the restrictions on the data strings of the categories by determining a category score indicating a match of a data string that matches the loose string format and meets the restrictions, wherein the classifying utilizes restriction information of non-selected categories when determining the matching of a selected category; and
   decreasing the category score of the selected category if a mean restriction matching proportion for the selected category is less than a threshold amount above an expected mean restriction matching proportion.

2. The method of claim 1, further comprising collecting all restrictions of the plurality of categories.

3. The method of claim 2, wherein the mean matching proportion of a restriction and the expected mean matching proportion of a restriction are determined by:
   determining a mean restriction matching proportion of the plurality of data strings;
   determining an expected mean restriction matching proportion using values obtained randomly from a domain of values; and
   generating a score indicating a correspondence between the restriction matching proportion and the expected restriction matching proportion.

4. The method of claim 3, wherein the threshold amount is four standard deviations.

5. The method of claim 1, wherein classifying comprises:
   determining a distance between a plurality of data strings and a distribution of the selected category; and
   determining a category score based on the determined distance.

6. The method of claim 1, wherein classifying comprises:
   determining a distribution of a plurality of data strings;
   determining a distance between the determined distribution and a plurality of known distributions of categories of data; and
   selecting as the selected category of the plurality of data strings that category from the plurality of known distributions of categories of data having a minimum determined distance.

7. The method of claim 6, wherein the the distance is determined according to a Kullback-Leibler distance.

8. A system comprising a processor, memory accessible by the processor, computer program instructions stored in the memory and executable by the processor, and data stored in the memory and accessible by the processor to perform:
   obtaining data including a plurality of data strings of a plurality of categories, the data strings in each category having a same string pattern;
   determining a loose string format and a set of restrictions based on at least one string pattern;
   classifying the plurality of data strings to respective categories based on the loose string format of the data strings and on the restrictions on the data strings of the categories by determining a category score indicating a match of a data string that matches the loose string format and meets the restrictions, wherein the classifying utilizes restriction information of non-selected categories when determining the matching of a selected category; and
   decreasing the category score of the selected category if a mean restriction matching proportion for the selected category is less than a threshold amount above an expected mean restriction matching proportion.

9. The system of claim 8, further comprising collecting all restrictions of the plurality of categories.

10. The system of claim 9, wherein the mean matching proportion of a restriction and the expected mean matching proportion of a restriction are determined by:
    determining a mean restriction matching proportion of the plurality of data strings;
    determining an expected mean restriction matching proportion using values obtained randomly from a domain of values; and generating a score indicating a correspondence between the restriction matching proportion and the expected restriction matching proportion.

11. The system of claim 10, wherein the threshold amount is four standard deviations.

12. The system of claim 8, wherein classifying comprises:
determining a distance between a plurality of data strings and a distribution of the selected category; and
determining a category score based on the determined distance.

13. The system of claim 8, wherein classifying comprises:
determining a distribution of a plurality of data strings;
determining a distance between the determined distribution and a plurality of known distributions of categories of data; and
selecting as the selected category of the plurality of data strings that category from the plurality of known distributions of categories of data having a minimum determined distance.

14. The system of claim 13, wherein the distance is determined according to a Kullback-Leibler distance.

15. A computer program product comprising a non-transitory computer readable storage having program instructions embodied therewith, the program instructions executable by a computer, to cause the computer to perform a method comprising:
obtaining data including a plurality of data strings of a plurality of categories, the data strings in each category having a same string pattern;
determining a loose string format and a set of restrictions based on at least one string pattern;
classifying the plurality of data strings to respective categories based on the loose string format of the data strings and on the restrictions on the data strings of the categories by determining a category score indicating a match of a data string that matches the loose string format and meets the restrictions, wherein the classifying utilizes restriction information of non-selected categories when determining the matching of a selected category; and
decreasing the category score of the selected category if a mean restriction matching proportion for the selected category is less than a threshold amount above an expected mean restriction matching proportion.

16. The computer program product of claim 15, further comprising collecting all restrictions of the plurality of categories.

17. The computer program product of claim 16, wherein the mean matching proportion of a restriction and the expected mean matching proportion of a restriction are determined by:
determining a mean restriction matching proportion of the plurality of data strings;
determining an expected mean restriction matching proportion using values obtained randomly from a domain of values; and
generating a score indicating a correspondence between the restriction matching proportion and the expected restriction matching proportion.

18. The computer program product of claim 17, wherein the threshold amount is four standard deviations.

19. The computer program product of claim 15, wherein classifying comprises:
determining a distance between a plurality of data strings and a distribution of the selected category; and
determining a category score based on the determined distance.

20. The method of claim 15, wherein classifying comprises:
determining a distribution of a plurality of data strings,
determining a distance between the determined distribution and a plurality of known distributions of categories of data, and
selecting as the selected category of the plurality of data strings that category from the plurality of known distributions of categories of data having a minimum determined distance; and
wherein the distance is determined according to a Kullback-Leibler distance.

* * * * *